UNITED STATES PATENT OFFICE.

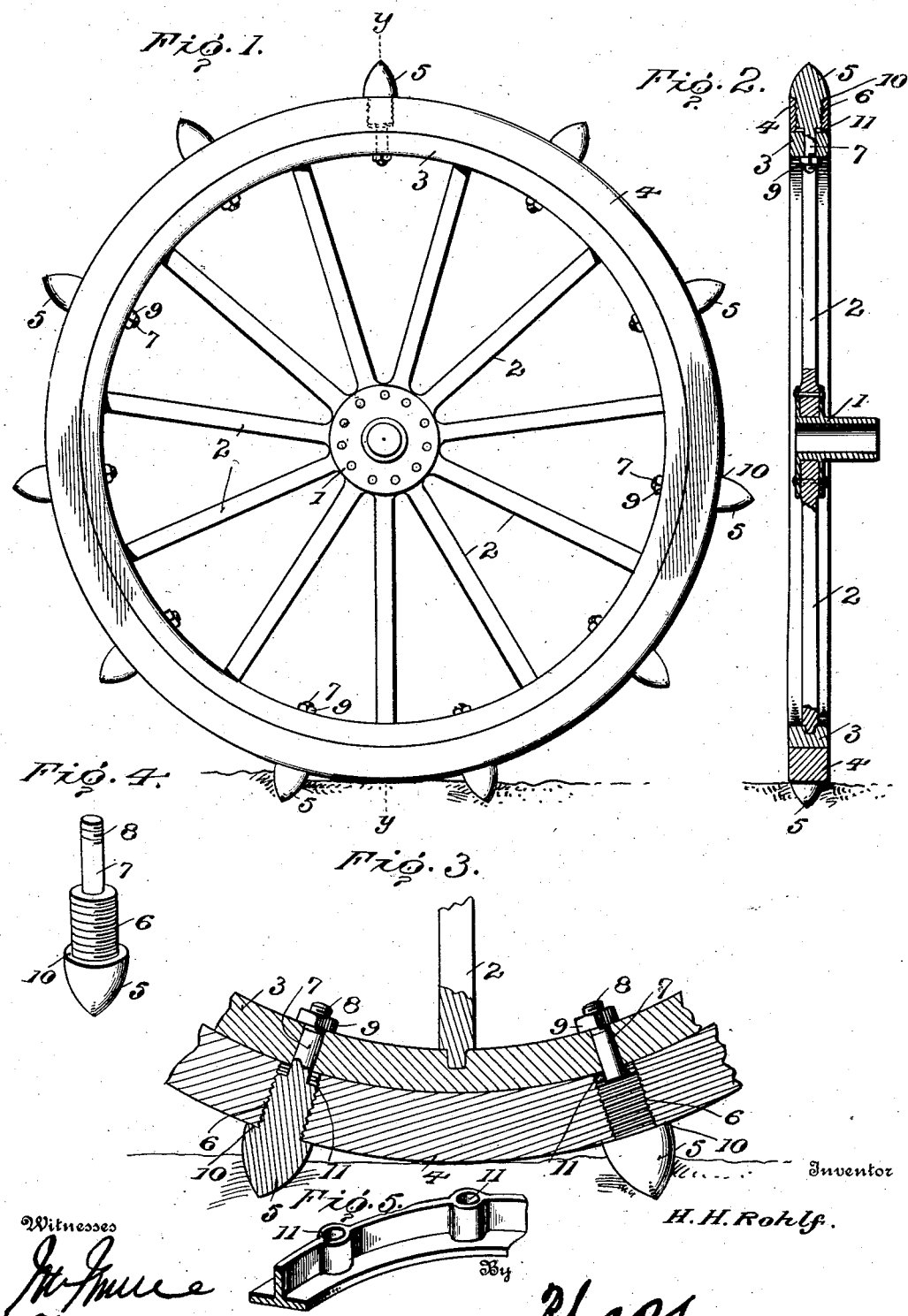

HENRY H. ROHLF, OF NEW LONDON, WISCONSIN, ASSIGNOR OF ONE-THIRD TO ADOLPH L. HAASE, OF NEW LONDON, WISCONSIN.

TRACTION-WHEEL.

No. 888,933.        Specification of Letters Patent.        Patented May 26, 1908.

Application filed September 9, 1907. Serial No. 391,986.

*To all whom it may concern:*

Be it known that I, HENRY H. ROHLF, citizen of the United States, residing at New London, in the county of Waupaca and State of Wisconsin, have invented certain new and useful Improvements in Traction-Wheels, of which the following is a specification.

Drive wheels, of implements and machines, propelled by power derived from a motor mounted thereon, are generally provided with cogs or projections to prevent slipping and to insure positive and certain application of the tractive force expended for driving purposes.

This invention relates to drive or traction wheels of the nature aforesaid, the purpose being to supply the same with removable cogs or lugs of novel formation and arrangement and which are utilized to secure the tire to the rim, thereby preventing displacement thereof.

The invention is shown in the accompanying drawing described hereinafter and particularly defined in the appended claims.

Figure 1 is a side view of a traction wheel embodying the invention. Fig. 2 is a transverse section of the wheel on the line $y$—$y$ of Fig. 1. Fig. 3 is an enlarged sectional view of a portion of the rim of the wheel, showing more clearly the construction and relative arrangement of the cogs or lugs. Fig. 4 is a detail perspective view of a cog or lug. Fig. 5 is a transverse section of a modified form of tire.

Corresponding and like parts are referred to in the following description and indicated in all the views of the drawings by the same reference characters.

The wheel comprises a hub 1, spokes 2 and a rim, the latter consisting of a felly 3 and a tire 4. These parts may be of any construction depending upon the design and special purpose for which the wheel is constructed. The felly 3, as also the spokes 2, is preferably of wood, whereas the tire 4 is of metal. The spokes 2 are tenoned into the felly. The cogs or lugs forming the projections are applied to the rim at points between the spokes and consist of pointed ends 5, a threaded body 6 and a stem 7, the latter being threaded at 8 to receive a set nut 9. A shoulder 10 is formed at the base of the pointed end 5 and is adapted to engage with the tread surface of the tire 4 and sustain the stress and load when the cog or lug is in position to receive the same.

The pointed end 5 may be of any formation and outline and by having the sides outwardly converged, the cog or lug is better enabled to penetrate a hard surface and thereby prevent slipping. The body portion 6 is externally threaded and of a less length than the thickness of the tire 4, thereby enabling the shoulder 10 or base of the outer end or projecting portion of the cog or lug to make contact with the tread surface of the tire and sustain the perpendicular stress and load. The stem 7 is adapted to pass through the opening formed in the felly 3 and to extend beyond the inner side thereof so as to receive the set nut 9 by means of which the felly is clamped to the tire. A series of threaded openings 11 are provided in the tire 4 to receive the threaded bodies or portions 6 of the cogs or lugs, thereby positively retaining the same in place. The set nuts 9 provide additional means for securing the cogs or lugs and at the same time serve to clamp the felly to the tire. By arranging the cogs or lugs between the spokes, they are more readily extracted and interference between the spokes and cogs is obviated, thereby enabling a broken or disabled cog or spoke to be readily replaced.

In the modification shown in Fig. 5, the tire is of T form in cross section, one flange or wing being in the plane of the wheel and the other wing or flange being at a right angle to the plane of the wheel. The openings 11 constitute sockets which are formed at intervals in the circumferential length of the outer wing or flange of the tire. This form of tire is preferred, as it admits of the wheels more readily cutting down to solid surface, and it is necessary to provide tractive force when traveling on snow and icy surfaces. This construction also practically doubles the length of the traction lugs or cogs by reason of the length of the sockets, the latter having portions projecting from opposite sides of the wing or flange of the tire in the plane of the wheel. This form of tire is also advantageous in traveling over soft surfaces and will safely carry the wheels over railroad crossings and the like, without allowing the lugs or cogs to become caught in crevices or holes, the conical shape of the projecting ends of the cogs or lugs preventing their becoming caught in openings or crevices.

Having thus described the invention, what is claimed as new is:

In a traction wheel, the combination of a rim comprising a felly and a tire, the same having registering openings, the openings in the tire being internally threaded and the openings in the felly being contracted, cogs, each consisting of a tapered end, a threaded body portion and a stem having its outer end threaded a shoulder being provided at the base or juncture of the body portion and pointed end, said cogs serving when in position to connect the tire and rim and having their shouldered portions engaged with the tread surface of the tire, their threaded body portions screwed into the threaded opening of the tire and their stems passed through the contracted openings of the felly, and set nuts fitted upon the threaded ends of the stems.

In testimony whereof I affix my signature in presence of two witnesses.

HENRY H. ROHLF. [L. S.]

Witnesses:
   J. KROMSCHINSKI,
   H. S. RITCHIE.